2,751,323

LAMINATED PRODUCTS AND METHOD OF PRODUCING THE SAME

James E. Pritchard, Bartlesville, and Pauline L. Quirk Myers, Barnsdall, Okla., assignors to Phillips Petroleum Company, a corporation of Delaware No Drawing. Application January 26, 1953, Serial No. 333,350

9 Claims. (Cl. 154—140)

This invention relates to laminated products. In a further aspect this invention relates to a bonding agent for producing laminated products. In a further aspect this invention relates to a method of preparing a bonding agent. In a further aspect this invention relates to a method of preparing laminated products. In a further aspect this invention relates to laminated products incorporating a bonding agent which comprises a quaternized polymer of a vinyl heterocyclic nitrogen base. In a further aspect this invention relates to the use of a quaternized polymer of a vinyl heterocyclic nitrogen base selected from the group consisting of the pyridine and quinoline series which, upon being quaternized, serves as the bonding agent.

Many bonding agents have been suggested in the literature for bonding materials such as metals, wood, paper, ceramics, glass, plastics, rubber, and various fabrics such as cotton, silk, rayon, nylon, Orlon and Dacron. Of considerable importance among these bonding agents are polymers of various polymerizable compounds and compositions containing these polymers with other resins, both natural and synthetic. The majority of bonding agents developed by the prior art are limited to specific applications and, even in these specific applications, often leave much to be desired.

Each of the following objects is attained by at least one of the aspects of this invention.

An object of this invention is to provide laminated products. A further object of this invention is to provide laminated products containing, as at least one layer, a quaternized polymer of a vinyl heterocyclic nitrogen base. A further object of this invention is to provide laminated products including at least one layer comprising a quaternized polymer of a vinyl heterocyclic nitrogen base of the pyridine or quinoline series. A further object of this invention is to provide bonding agents comprising these polymers. A further object of this invention is to provide a method of preparing these bonding agents and a method of preparing laminated products using these bonding agents.

Other objects and advantages of our invention will be apparent to one skilled in the art upon reading of this disclosure.

According to our invention a polymer, and by this term we intend to include copolymers, of a vinyl heterocyclic nitrogen base has a quaternizing agent incorporated therein to form a bonding agent. Preferred vinyl heterocyclic nitrogen bases are those of the pyridine or quinoline series. To form the laminated product, the composition including the polymer and the quaternizing agent is applied to the surface of the materials to be joined, these surfaces are placed in contact with each other, and the resulting laminated product is heated until a strong bond is formed. Materials such as metals, wood, paper, ceramics, glass, plastics, rubber and various fabrics such as cotton, silk, rayon, Orlon and Dacron can be employed in conjunction with the quaternized polymers to prepare the laminated products of our invention.

According to our invention, a quaternizing agent is first incorporated with a homopolymer of a vinyl heterocyclic nitrogen base of the pyridine or quinoline series, or a copolymer of a vinyl heterocyclic nitrogen base with a conjugated diene. The resulting mixture is then applied to the surface to be bonded and the surfaces are brought together and heated to effect the quaternization reaction. The temperature and time are functions of the activity of the quaternizing agent. We prefer to use temperatures in the range of 60 to 40° F., and, using these temperatures times varying between 15 minutes and 24 hours are suitable. We have also found that a stronger bond will be produced when the surface to be bonded is held under pressure during the heating period. Pressures from a few pounds to 10,000 p. s. i. or higher are applicable depending largely upon the materials being bonded.

The quaternizing agent can be incorporated with the polymeric material by any suitable means. One method is to mix the materials on a mill. Another method comprises dissolving the polymer in an organic solvent and adding the quaternizing agent to the resulting solution or dispersion. Suitable solvents include benzene, toluene, xylene, carbon tetrachloride, chloroform and the like. These solutions generally contain from 1 to 20 per cent by weight of the polymer, although more concentrated solutions can sometimes be used. Such solutions can be applied to the surfaces to be bonded by painting or spraying. In instances where no solvent is employed, such as resulting from preparing the mixture on a mill, the mixture of polymer and quaternizing agent is spread or pressed onto the surface to be bonded.

In the practice of this invention, the excellent bonding properties of our material are the result of the interaction of a quaternizing agent with a polymer of a vinyl heterocyclic nitrogen base of the pyridine or quinoline series. The nature of the reaction taking place is thoroughly described in a copending application of J. E. Pritchard, Serial No. 284,448 filed April 25, 1952.

Quaternizing agents useful in this invention may be used singly, or mixtures thereof are also suitable. These agents, which are numerous include the various alkyl halides such as methyl iodide, methyl bromide, ethyl iodide, propyl iodide, hexyl iodide, nonyl bromide, cetyl bromide; the various alkylene halides such as ethylene iodide, ethylene bromide, propylene chloride, butene bromide, octene bromide; the various substituted alkanes and cycloalkanes necessarily including the above alkyl and alkylene halides, which contain at least one hydrogen atom attached to a carbon atom, such as bromoform, chloroform, 1,2 - dichloropropane, 1,2 - dibromobutane, ethylene chlorohydrin, acetyl chloride, iodoform, chloroacetyl chloride; alkyl sulfates such as methyl sulfate, ethyl sulfate, and the various substituted aromatic compounds such as picryl chloride, benzoyl chloride, phenyl chloride, benzene sulfonyl chloride, benzyl chloride, benzal chloride, benzotrichloride, methyl benzene sulfonate. Other materials which may be employed as quaternizing agents in the practice of this invention include the various polyhalogenated cycloalkenes such as hexachlorocyclopentadiene. The foregoing enumeration is not intended to include all the possible suitable quaternizing agents, but is only representative since many others can be used. If an organic compound contains an active halogen atom attached to a carbon atom or contains a similar active quaternizing group and if the compound is not an acid, it is useful in our invention. In general, active quaternizing agents such as organic halides, organic sulfates, and organic acid chlorides and the like, which contain not more than 20 carbon atoms per molecule and contain at least one halogen or equivalent quaternizing group; for example, an alkyl arylsulfonate, an aryl alkylhalide, an alkyl sulfate or the like, are satisfactory in the practice of this invention for the production of solid polymers from copolymers of a conjugated diene and a copolymerizable heterocyclic nitrogen base. Those compounds which contain the configuration

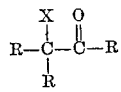

or

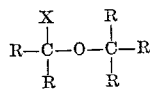

wherein X is a halogen atom such as chlorine, bromine and iodine and the R's represent oxygen, hydrogen or carbon valence linkages to their respective carbon atoms, are especially useful.

For a complete discussion of the quaternization reaction, attention is directed to the above mentioned application of J. E. Pritchard, one of the inventors of the present invention. However, it should be pointed out that in quaternary compounds the nitrogen atom has four of its valence bonds attached to carbon atoms. Thus, considering a polymer containing a pyridine derivative reacting with a compound XY, they all would contain the following structure as part of the molecule following the quaternization reaction wherein X is any molecular fragment in which a carbon atom is attached to the nitrogen atom and Y is the remaining molecular fragment such as an atom or radical (anion).

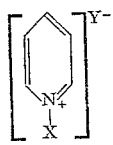

It is generally preferred that the quaternizing agent be employed in an amount sufficient to effect substantially complete conversion of the pyridine and/or quinoline units of the polymer to the corresponding pyridinium and/or quinolinium units. If desired, however, more or less than the stoichiometric amount of the quaternizing agent can be used depending upon the type of bond desired in the laminated product. For example, only about 20 to 50 per cent of the required stoichiometric amount might be considered sufficient in some cases while in other cases a 10 per cent stoichiometric excess over the amount theoretically required might be preferred.

Regardless of the amount of quaternizing agent added, this addition produces a plasticizing effect upon the polymer. The resulting mixture, before quaternization takes place, always has a viscosity lower than the original viscosity of the polymer. As the quaternization reaction takes place, the material becomes less plastic, this occurring at a rate which depends upon the particular quaternizing agent employed and the temperature level at which the mixture is maintained. This reaction, which is a non-ionic one, should not be confused with the reaction between a pyridine compound and an acidic substance wherein the reaction is an ionic one. The ionic reaction is practically instantaneous. When an acid is added to such a polymer the instantaneous reaction causes the material to be very difficult to handle in operation such as milling because of an instantaneous viscosity increase.

When the quaternizing agent is added, the material is more easily handled than is the original polymer. This fact leads to one of the advantages of the present invention, this being that the mixture of the polymer and the quaternizing agent can be applied to the materials to be bonded without the necessity for using an additional solvent or softening material. Since the solvent is not necessary the materials to be bonded can be placed in contact immediately following the application of the bonding material without waiting for the solvent to evaporate. If the bond is made before the solvent evaporates, as is necessary with many prior art materials, gas holes will be formed when the bond is heated.

The polymeric starting materials are homopolymers of a vinyl heterocyclic nitrogen base of the pyridine or quinoline series or copolymers of these materials with conjugated dienes. These polymers can be prepared by any method known to the art and can range from liquid to rubbery to resinous polymers. For the preparation of these polymers the conjugated diene component can range from 0 to 98 parts, and the vinyl heterocyclic nitrogen base component from 100 to 2 parts, by weight per 100 parts of monomeric material.

The conjugated dienes employed are preferably those which contain from four to six, inclusive, carbon atoms per molecule and include 1,3-butadiene, isoprene, piperylene, methylpentadiene, 2,3-dimethyl-1,3-butadiene, chloroprene, and others. However, conjugated dienes having more than six, such as eight, carbon atoms per molecule can also be used. Furthermore, various alkoxy, such as methoxy and ethoxy, and cyano derivatives of these conjugated dienes are also applicable.

The heterocyclic nitrogen bases which are applicable are those of the pyridine and quinoline series which are copolymerizable with a conjugated diene and contain at least one

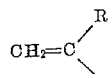

substituent wherein R is either hydrogen or a methyl group, i. e., the substituent is either a vinyl or an alpha-methylvinyl (isopropenyl) group. The vinyl-substituted heterocyclic nitrogen bases of the pyridine and quinoline series which are preferred are those having only one

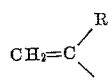

substituent and of these compounds those belonging to the pyridine series are most frequently used. Various alkyl-substituted derivatives can also be used but it is generally preferred that the total number of carbon atoms in the nuclear substituted alkyl groups should not be greater than 12 and most frequently these alkyl substituents are methyl and/or ethyl. It is to be understood that mixtures of various conjugated dienes and mixtures of various copolymerizable heterocyclic nitrogen bases can be employed in the practice of the invention. Typical heterocyclic nitrogen compounds include 2-vinylpyridine, 5-methyl-2-vinylpyridine, 5-ethyl-2-vinylpyridine, 2-methyl-5-vinylpyridine, 2,5-divinylpyridine, 3-methyl - 2,5 - divinylpyridine, 4 - methyl - 3 - vinylpyridine 2 - isopropenylpyridine, 5 - propyl - 2 - isopropenylpyridine, 2 - octyl - 5 - vinylpyridine, 2 - vinylquinoline, 8 - ethyl - 2 - vinylquinoline, 4 - hexyl - 5 - vinylquinoline, 1 - vinylisoquinoline, 5 - methyl - 1 - isopropenylisoquinoline, 1,8 - divinylisoquinoline, 2,5 - divinylquinoline, 6,7 - dimethyl - 2,5 - divinylquinoline, etc.

Much stronger bonds are produced by the quaternized polymers herein described than are produced when similar polymers are compounded in a conventional recipe without a quaternizing agent and the mixture heated under the same conditions.

*Example 1*

An 80/20 butadiene/2-methyl-5-vinylpyridine copolymer having a Mooney value (ML-4) of 44, was prepared by emulsion polymerization at 122° F. in accordance with the following recipe:

| | Parts by weight |
|---|---|
| Butadiene | 80 |
| 2-methyl-5-vinylpyridine | 20 |
| Water | 180 |
| Fatty acid soap | 5 |
| Mercaptan blend [1] | 0.4 |
| $K_2S_2O_8$ | 0.3 |

[1] A blend of tertiary $C_{12}$, $C_{14}$ and $C_{16}$ aliphatic mercaptans in a ratio of 3 : 1 : 1 parts by weight.

A commercial mixture of dichloropropanes was milled into a portion of the 80/20 butadiene/2-methyl-5-vinylpyridine copolymer in the ratio of 9.5 parts by weight dichloropropane per 100 parts by weight of copolymer or 0.5 mol per mol of 2-methyl-5-vinylpyridine used in preparation of the copolymer. Approximately 1.5 grams of the mixture was placed between the flat surfaces of two steel cylinders each having a surface area of 0.75 square inch. The cylinders were then heated 30 minutes at 307° F. under a pressure of 2000 p. s. i. The tensile strength of the bond formed, measured by a longitudinal pull on the laminated structure, was 136 p. s. i.

A similar run was made in which benzotrichloride was milled into a portion of the 80/20 butadiene/2-methyl-5-vinylpyridine copolymer in the ratio of 16.6 parts by weight benzotrichloride per 100 parts by weight of copolymer or 0.5 mol per mol of 2-methyl-5-vinylpyridine used in the preparation of the copolymer. The laminated structure was heated as before. The tensile strength of the bond was 716 p. s. i.

As a control a portion of the butadiene/2-methyl-5-vinylpyridine copolymer was compounded using the following recipe:

| | Parts by weight |
|---|---|
| Copolymer | 100 |
| Sulfur | 1.75 |
| Zinc oxide | 5.0 |
| N-cyclohexyl-2-benzothiazole-sulfenamide | 1.5 |
| Stearic acid | 1.0 |

A 1.5-gram sample of this material was placed between the surfaces of two steel cylinders as in the other runs and the cylinders were then heated as before. A very weak bond was formed which broke before a test for tensile strength was made.

*Example II*

A 75/25 butadiene/2-methyl-5-vinylpyridine copolymer, having a Mooney value (ML-4) of 25, was prepared by emulsion polymerization at 122° F. using the recipe of Example I except that 0.5 part mercaptan blend was employed instead of 0.4 part. One hundred parts by weight of this copolymer was mixed on the mill with 20 parts benzotrichloride (0.5 mol per mol 2-methyl-5-vinylpyridine used in the preparation of the copolymer). A sample of this material was placed between two pieces of steel strap 0.25 x 1 x 7 inches and the resulting structure heated 30 minutes at 307° F. under a pressure of 1000 p. s. i. The laminated structure was bent at a 90 degree angle without rupture of the bond.

A control run was made by compounding a sample of the butadiene/2-methyl-5-vinylpyridine copolymer in accordance with the following recipe:

| | Parts by weight |
|---|---|
| Copolymer | 100 |
| Sulfur | 1.75 |
| Zinc oxide | 5.0 |
| Butyl 8 [1] | 2.0 |

[1] Dithiocarbamate-type rubber accelerator.

A sample of this material was placed between two pieces a steel strap as described above and the resulting structure heated as before. When the laminated structure was bent at a 90 degree angle, the bond ruptured.

*Example III*

An 80/20 butadiene/2-methyl-5-vinylpyridine copolymer prepared as described in Example I was mill mixed with benzotrichloride in the ratio of 100 parts by weight of the copolymer to 32.8 parts by weight of the quaternizing agent (one mol quaternizing agent per mol 2-methyl-5-vinylpyridine used in the preparation of the copolymer). Two pieces of steel strap 0.25 x 1 x 7 inches were joined by a two-inch lap-joint in which a layer of the quaternized material was interspersed between the overlapping portions of the metal. The joint so formed was placed under a pressure of 1000 p. s. i. and heated at 307° F. for one hour. The metal strap was then placed in a horizontal position with a support at each end. The joint withstood a weight of approximately 200 pounds without rupture.

*Example IV*

A 90/10 butadiene/2-methyl-5-vinylpyridine liquid copolymer was prepared in accordance with the emulsion polymerization recipe given in Example I except that the amount of mercaptan blend was increased to 5 parts. One hundred parts by weight of this copolymer was mixed with 16.6 parts by weight of benzotrichloride (one mol per mol 2-methyl-5-vinylpyridine used in the preparation of the copolymer). A sample of this material was placed between two pieces of steel strap as described in Example II and the structure heated under a pressure of 1000 p. s. i. for 30 minutes at 307° F. and then heated in an oven an additional 15 hours at 176° F. A control run was made in the same manner described in Example II except that the 90/10 butadiene/2-methyl-5-vinylpyridine copolymer without quaternizing agent was employed and the sample was heated under a pressure of 1000 p. s. i. for 30 minutes at 307° F. and then heated in an oven for 15 hours at 176° F. The bond formed with the quaternized material was much stronger than the control.

*Example V*

A sample of the 75/25 butadiene/2methyl-5-vinylpyridine copolymer described in Example II was dissolved in benzene in sufficient amount to give a 10 weight percent solution of the copolymer. To a portion of this solution benzal chloride was added in the ratio of 17.2 parts by weight per 100 parts of copolymer. This solution was painted onto one end of each of two steel cylinders as described in Example I and the cylinders allowed to stand until the solvent had evaporated. They were then placed together under a pressure of 1000 p. s. i. and heated 30 minutes at 307° F. A strong bond was formed.

*Example VI*

A run was made similar to Example V using benzene as the solvent and epibromohydrin as the quaternizing agent. Epibromohydrin was added in the ratio of 28.8 parts by weight per 100 parts of copolymer. After applying a coat of the solution to steel cylinders and heating as in Example V, a very strong bond was formed.

*Example VII*

The procedure of Example V was followed using the solution described therein except for the application of three coats of the solution instead of one coat. The cylinders were placed together under a pressure of 1000 p. s. i. and heated 30 minutes at 307° F. The tensile strength of the bond formed, measured by a longitudinal pull on the laminated structure, was 345 p. s. i.

*Example VIII*

A copolymer solution was prepared as in Example V except that carbon tetrachloride was used as the solvent instead of benzene. Benzal chloride was added in the amount given in Example V and the laminated structure was heated under the conditions described therein. A strong bond was formed.

A similar run made using ethylenechlorohydrin (17.0 parts by weight per 100 parts copolymer) also gave a strong bond. The tensile strength, measured by a longitudinal pull on the laminated structure, was 150 p. s. i.

*Example IX*

Three 75/25 butadiene/2-methyl-5-vinylpyridine copolymer solutions were prepared in the manner described in Example V using the following solvents and quaternizing agents:

(1) Benzene as solvent and 27.0 parts by weight of benzyl chloride per 100 parts copolymer;
(2) Carbon tetrachloride as solvent and 17.2 parts by weight of benzal chloride per 100 parts copolymer;
(3) Carbon tetrachloride as solvent and 17.0 parts by weight ethylenechlorohydrin per 100 parts copolymer.

The flat surfaces of steel cylinders as hereinbefore described were painted with one coat of the solution being tested and then let stand for sufficient time to allow the solvent to evaporate. A disk of butyl rubber (0.07 inch in thickness), previously compounded and cured, was inserted between the metal cylinders and the structure placed under a pressure of 1000 p. s. i. and heated 30 minutes at 307° F. Good bonds were formed in all cases.

*Example X*

The following materials were employed to form a bond between two pieces of steel strap as described in Example II. Subsequent to applying the bonding agents, the structures were placed under a pressure of 1500 p. s. i. and heated an hour at 307° F.

(1) One mol of benzotrichloride (based on the 2-methyl-5-vinylpyridine) was milled into an 80/20 butadiene/2-methyl-5-vinylpyridine copolymer. After heating a strong bond was formed which was very difficult to break.

(2) The test described in (1) was repeated except that ethylenechlorohydrin was used. A strong bond was formed.

(3) The test described in (1) was repeated using benzotrichloride except that after the first heating under pressure, the structure was heated in an oven for 15 hours at 176° F. The bond was noticeably stronger than in (1).

(4) An 80/20 butadiene/2-methyl-5-vinylpyridine copolymer was compounded in accordance with the following recipe:

|  | Parts by weight |
| --- | --- |
| Copolymer | 100 |
| Zinc oxide | 5 |
| Sulfur | 1.5 |
| N-cyclohexyl-2-benzothiazolesulfenamide | 1.75 |
| Stearic acid | 1 |

The bond formed was easily broken.

(5) A sample of GR–S (41° F. butadiene/styrene rubber, approximately 60 ML-4) was compounded using the recipe in (4). The bond formed was easily broken.

As many possible embodiments can be made of this invention without departing from the scope thereof, it is to be understood that all matter herein set forth is to be interpreted as illustrative and not in a limiting sense.

We claim:

1. A process of preparing a laminated article comprising applying to at least one of two surfaces to be joined a bonding composition comprising a polymer of a vinyl-substituted heterocyclic nitrogen base and a quaternizing agent, placing said surfaces in contact, and heating same to form a strong bond, said heating causing a reaction between at least a portion of the nitrogen atoms of said polymer and said quaternizing agent resulting in the formation of the fourth nitrogen to carbon bond.

2. The process of claim 1 in which said bonding composition contains a copolymer of 2-methyl-5-vinylpyridine and butadiene.

3. The process of claim 1 in which, after applying the bonding composition, the laminated article is heated to a temperature in the range of 60 to 400° F. for a time sufficient to effect the quaternization reaction.

4. The process of claim 1 in which said quaternizing agent is selected from the group consisting of dichloropropane, benzotrichloride, benzal chloride, epibromohydrin, and ethylenechlorohydrin.

5. A laminated product containing at least one layer which comprises the reaction product of a polymer of a vinyl-substituted heterocyclic nitrogen base and a quaternizing agent, said reaction product being characterized by the fact that at least a portion of the nitrogen atoms in said polymer have a fourth nitrogen to carbon bond.

6. The product of claim 5 where the vinyl-substituted heterocyclic nitrogen base is selected from the group consisting of members of the pyridine and quinoline series.

7. The product of claim 5 in which said polymer is a copolymer of the vinyl-substituted nitrogen base and a conjugated diene copolymerizable therewith.

8. The product of claim 7 in which said nitrogen base contains at least one and not more than two

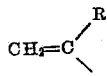

groups where R is selected from the group consisting of hydrogen and a methyl group, and not more than 12 carbon atoms in nuclear substituted alkyl groups.

9. The product of claim 5 in which said nitrogen base is 2-methyl-5-vinylpyridine.

References Cited in the file of this patent

UNITED STATES PATENTS

| 2,484,420 | Minsk et al. | Oct. 11, 1949 |
| 2,484,430 | Sprague et al. | Oct. 11, 1949 |
| 2,619,445 | Kalafus | Nov. 25, 1952 |